United States Patent [19]
Ross

[11] 3,859,647
[45] Jan. 7, 1975

[54] PHOTOELECTRIC INTRUSION SENSING DEVICE EMPLOYING SYNCHRONOUS DEMODULATION

[75] Inventor: Thaddeus Christopher Ross, Santa Barbara, Calif.

[73] Assignee: Infrared Industries, Inc., Santa Barbara, Calif.

[22] Filed: Aug. 25, 1971

[21] Appl. No.: 174,715

[52] U.S. Cl. .............. 340/258 B, 250/221, 340/276
[51] Int. Cl. .......................................... G08b 13/18
[58] Field of Search ........... 340/258 R, 258 B, 276, 340/228 S; 250/221

[56] References Cited
UNITED STATES PATENTS

| | | | |
|---|---|---|---|
| 2,912,683 | 11/1959 | Bagno | 340/258 B |
| 3,089,065 | 5/1963 | Worden | 340/258 B X |
| 3,370,284 | 2/1968 | Bagno | 340/258 B |
| 3,370,285 | 2/1968 | Cruse et al. | 340/258 B |
| 3,534,351 | 10/1970 | Harnden et al. | 250/221 X |
| 3,603,957 | 9/1971 | Merchant | 340/258 B |
| 3,605,082 | 9/1971 | Matthews | 340/258 B |
| 3,641,549 | 2/1972 | Misek et al. | 340/258 B |
| 3,711,846 | 1/1973 | Schlisser | 340/258 B |
| 3,727,207 | 4/1973 | Missio | 340/258 B |

Primary Examiner—Glen R. Swann, III
Attorney, Agent, or Firm—Dominik, Knechtel, Godula & Demeur

[57] ABSTRACT

A photoelectric infrared intrusion sensing system employs a method of synchronous demodulation, the power line disturbance resulting from the transmitter's transmitting a pulse of infrared energy is monitored and detected in a control unit, and is used to key a synchronous gate to receive an output signal from the receiver, simultaneously with the detection of the transmitted pulse of infrared energy being incident upon the receiver. If no signal is received by the control unit from the receiver, or the signal received is out of phase or of the wrong polarity, an alarm condition is established.

7 Claims, 4 Drawing Figures

INVENTOR
THADDEUS CHRISTOPHER ROSS

ATTYS.

PHOTOELECTRIC INTRUSION SENSING DEVICE EMPLOYING SYNCHRONOUS DEMODULATION

SUMMARY OF THE INVENTION

This invention relates, generally, to an improved intrusion sensing system. More particularly, it relates to an improved photoelectric infrared intrusion sensing system.

The system of the present invention includes three functional elements, namely: a transmitter, a receiver, and a control unit. The transmitter and receiver are arranged along a line of sight either directly or with the aid of beam deflecting mirrors such that the optical signal developed by the transmitter is incident on the receiving optics and detector of the receiver. Interruption of the beam is the alarm criterion and is detected by the receiver as the disappearance of the transmitted signal.

Power supplies for all of the elements of the system are housed in the control unit. Separate lines supply the transmitter and the receiver with all interconnections being made inside the control unit. In the event any of the lines are cut or the connections are tampered with, the alarm relay is tripped. Similarly, the control unit is protected by a tamper sensing switch activated by removal of the cover.

The size and configuration of the various units of the system are such that the system is suitable for both industrial and home use, and furthermore, may be easily installed in old and new construction. The system normally operates on a standard 115 VAC power source, but can be batter operated, with the control unit including a charging circuit for the battery. This latter feature permits the system to be used in remote locations and, in particular, on marine vehicles such as boats and the like which may be anchored or docked in a harbor not having electrical power available.

System security is provided by use of a modulated optical signal which substantially eliminates false alarms from lighting, flickering sunlight and other intermittent forms of light which may impinge on the receiver. Additional security is provided by synchronous demodulation of the output signals from the receiver as a function of the optical signal projected by the transmitter, with both the signal amplitude and phase being continuously monitored.

The system is easily installed and aligned without the need of complicated optical alignment devices or meters. The receiver, or transmitter, is aligned with the other, by simply plugging an earphone jack into the receiver and then aligning the transmitter and receiver so that the optical signal impinged on the receiver produces the maximum audible output.

A unique method of synchronous demodulation is used, in that the power line disturbance resulting from the transmitter transmitting a pulse of infrared energy is monitored and detected in the control unit, and is used to key a synchronous gate to receive an output signal from the receiver, simultaneously with the detection of the transmitted pulse of infrared energy being incident upon the receiver. If no signal is received by the control unit from the receiver, or the signal received is out of phase or of the wrong polarity, an alarm condition is established. A response time of approximately 0.1 seconds is provided, with a reset-delay which can be established from 1 to 15 seconds. The receiver furthermore includes an automatic gain control so that no gain adjustments are required at the time of installation.

Accordingly, it is a principal object of the present invention to provide an improved intrusion sensing system. More particularly, it is an object to provide an improved photoelectric infrared intrusion sensing system.

Another object is to provide an improved intrusion sensing system wherein the optical signal developed by the transmitter can be made incident on the receiver of the system, either directly or with the aid of beam deflecting mirrors.

Still another object is to provide an improved intrusion sensing system which normally operates on a standard 115 VAC power source, but which can be battery operated or, alternatively, provided with a rechargeable standby battery in the event of power failure.

A still further object is to provide an improved intrusion sensing system which can be easily and quickly installed and aligned, even at the maximum working distance of the system, without the need of complicated optical alignment devices or meters.

A still further object is to provide an improved intrusion sensing systm operating on the interrupted-beam principle, a safe condition being maintained by continuous sensing by the receiver of modulated radiant energy from a transmitter. In this respect, the system security is increased by synchronous demodulation, the signal amplitude and phase both being continuously monitored.

A still further object is to provide an improved intrusion sensing system wherein the removal of the control unit cover or the cutting of any wires or any tampering with connections between the elements of the system actuates the alarm.

Still another object is to provide an improved intrusion sensing system wherein the transmitter power line disturbance resulting from the transmitter transmitting a pulse of optical energy is used as the keying signal for operating the gated detector of the control unit, to sense the signal amplitude and phase of the output signal of the receiver.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

BRIEF DESCRIPTION OF THE DRAWINGS

Similar reference characters refer to similar parts throughout the several views of the drawings.

DESCRIPTION OF PREFERRED EMBODIMENTS

Figure 1:
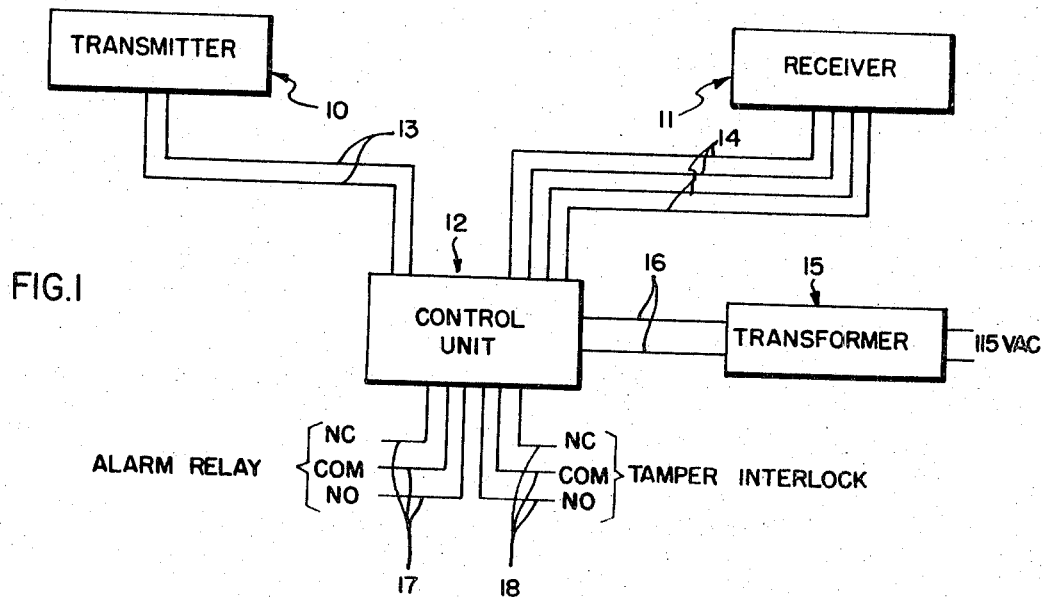
FIG. 1 is a block diagram-type schematic of the intrusion sensing system.

Referring now to the drawings, in FIG. 1 the intrusion sensing system of the present invention is illustrated in block diagram schematic and it can be seen to include a transmitter 10, a receiver 11 and a control unit 12. As indicated above, the transmitter and receiver are arranged along a line of sight either directly or with the aid of beam deflecting mirrors such that the optical signal developed by the transmitter is incident on the receiving optics and detector of the receiver 11.

The transmitter 10 preferably and advantageously is enclosed within an all metal case with drip-proof gasketing, as is the receiver 11. In an operable embodiment, both the transmitter 10 and the receiver 11 are adapted to be enclosed within a case which is only 3-5/16 inches by 2-7/16 inches by 2-13/16 inches. The control unit 12 is only 8-1/8 inches by 5-5/16 inches by 3-7/16 inches.

The transmitter 10 is coupled to the control unit 12 by two low voltage lead wires 13, while the receiver 11 is coupled to the control unit 12 by means of four low voltage lead wires 14. The control unit 12 houses the power supplies for the transmitter 10 and the receiver 11, as well as the complete alarm activating circuit. A transformer 15 having a 12 VAC secondary and a 115 VAC primary is adapted to be plugged into any standard wall outlet and is coupled to the control unit by two low voltage lead wires 16. Three low voltage lead wires 17 couple the control unit 12 to a main alarm relay, not shown. The three low voltage lead wires 18 couple the tamper interlock (not shown) which is a spring loaded switch normally held in compression by the cover of the control unit 12 to another alarm relay (not shown). In the event any of these low voltage lines are cut or the connections are tampered with, the arrangement is such that the alarm relay is tripped. Furthermore, removal of the cover of the control unit 12 activates the tamper interlock to trip the alarm relay.

Figure 2:
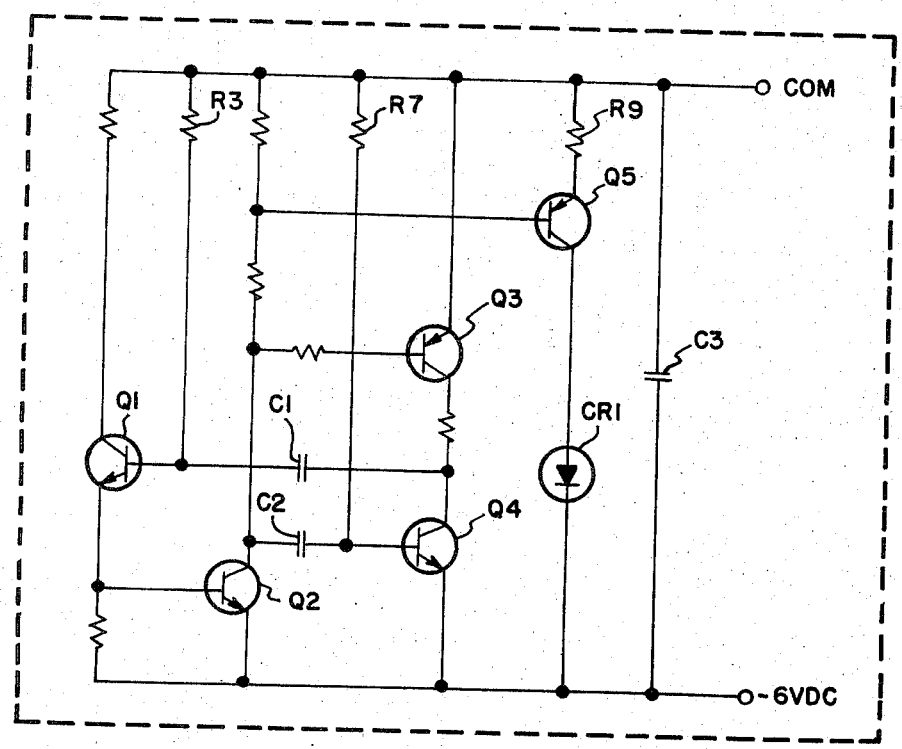
FIG. 2 is a schematic diagram of the transmitter of the intrusion sensing system.

Referring now to FIG. 2, which is a schematic of the transmitter 10, it can be seen that the transmitter 10 includes a diode CR1 which is a gallium arsenide infrared emitter. The diode CR1 is pulsed by a transistor Q5 with a duty cycle of 1 in 100. Each time the transistor Q5 conducts and drives current through the diode CR1, infrared energy is emitted. The duration of the current pulse is approximately 50 microseconds and the repetition rate is about 200 per second. The transistors Q1, Q2, Q3 and Q4 comprise a free-running asymmetrical multi-vibrator which controls the on and off periods of conduction of the transistor Q5.

When the diode CR1 is emitting infrared energy, trnsistor Q2 is conducting, drawing base current of the transistors Q5 and Q3. Simultaneously, transistor Q2 draws current through the resistor R7 and the capacitor C2, keeping the transistor Q4 cut off, thus allowing transistor Q3 to feed base current to the transistor Q1 through the capacitor C1. The strongly driven transistor Q1 feeds base current to the transistor Q2 maintaining the latter conducting and charging the capacitor C2 through the resistor R7.

At the end of 50 microseconds, the capacitor C2 fed by the resistor R7 builds up sufficient charge to raise the voltage on the base of the transistor Q4 above its conduction threshold, causing the transistor Q4 to conduct and, in the process, through the capacitor C1, cut off the base current of the transistor Q1. With the transistor Q1 cut off, the transistor Q2 stops conducting, cutting off the transistor Q3 and Q5. The transistor Q5, in turn, stops the diode CR1 from conducting, thus terminating the emission of radiant energy.

With the transistor Q4 conducting, the base current of the transistor Q1 which would normally be supplied by the resistor R3 is diverted to recharge the capacitor C1 through the transistor Q4. The RC time constant of the resistor R3 and the capacitor C1 sets the cut off period of the transistor Q1 and, in turn, that of the transistors Q2, Q3 and Q5 before the cycle repeats. The capacitor C3 is a line filter and the resistor R9 limits the magnitude of the current pulse which the transistor Q5 drives through the diode CR1.

Figure 3:
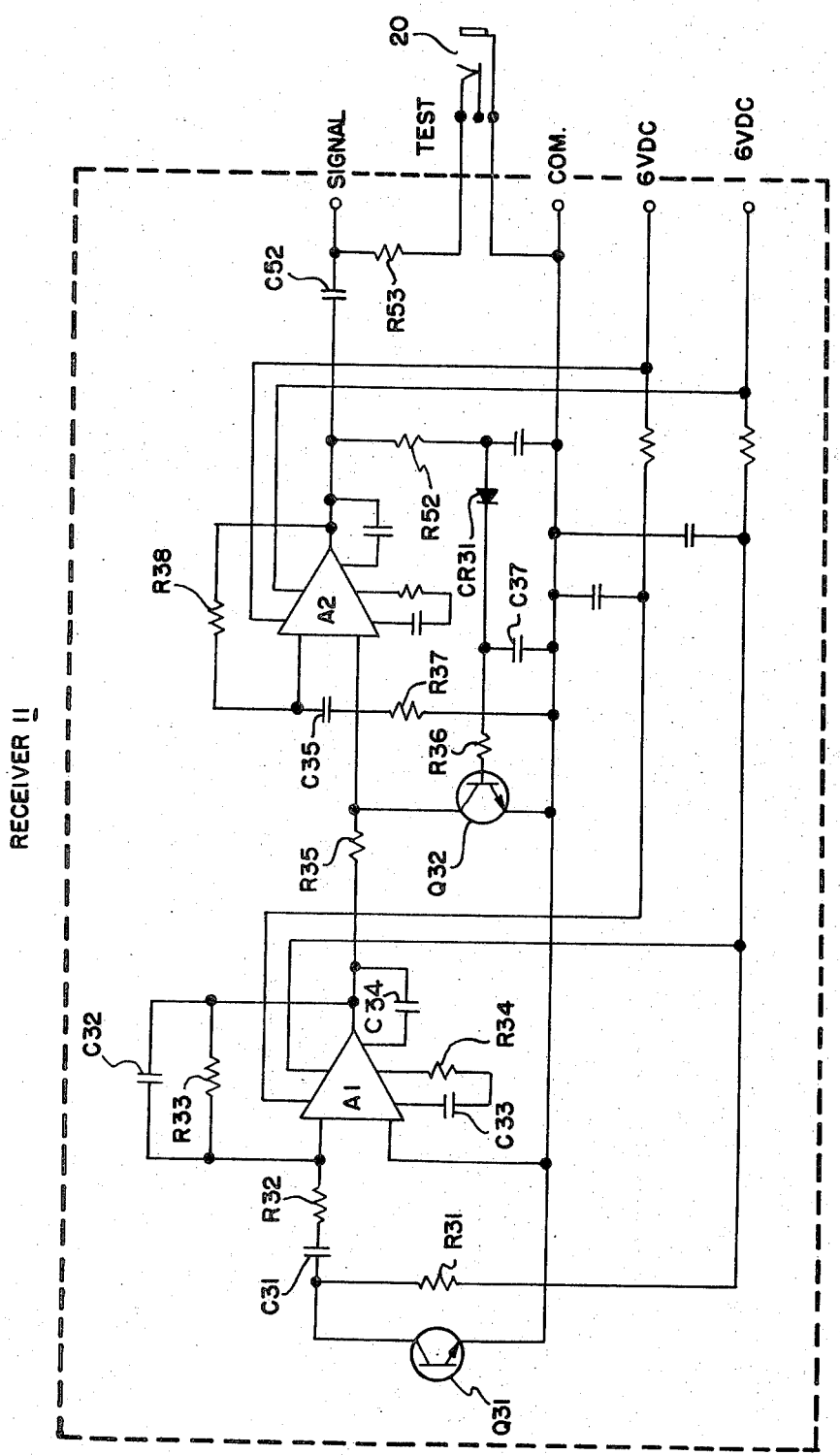
FIG. 3 is a schematic of the receiver of the intrusion sensing system.

Referring now to FIG. 3, which is a schematic of the receiver 11, the infrared energy emitted by the diode CR1 is detected by the transistor Q31 which is a silicon phototransistor. The resistor R31 is a DC load resistor for the transistor Q31. Each received energy pulse produces a negative going electrical pulse at the capacitor C31, by virtue of the return of the resistor R31 to a positive bias voltage.

This negative pulse is applied through the capacitor C31 and the resistor R32 to the inverting input of the operational amplifier A1 which can be, for example, a 709 type, resulting in a positive polarity output pulse applied to the coupling resistor R35. A feed back resistor R33 defines the gain of this stage with the capacitor C32 providing frequency roll-off to reduce high frequency random noise in the stage. A compensating network comprising the resistor R34 and the capacitor C33 and a capacitor C34 are picked to stabilize this amplifier stage at high frequencies, yet retain sufficiently high frequency response to adequately reproduce the fast rising signal pulse.

The amplifier A2 is another operational amplifier and can be of the same type as the amplifier A2, except that, in this case, the signal is fed into its non-inverting input so as to benefit from the high input impedence thereof. The gain of this amplifier stage is set by the ratio of feedback resistor R38 to the summing point resistor R37. The capacitor C35 decouples ground reference from the summing point to reduce the unwanted DC gain of this amplifier stage to unity.

At the output of the operational amplifier A2, the output signal which consists of a greatly amplified positive pulse is fed back through a resistor R52 and a peak detector diode CR31 to the storage capacitor C37. The voltage on the capacitor C37 is therefore a function of the output signal level, and is applied to the base of the gain control transistor Q32 through the coupling resistor R36. The transistor Q32 acts as a variable resistor whose conduction is controlled by the level of the voltage on the capacitor C37. The higher the positive voltage on the capacitor C37, the more conductive the transistor Q32 becomes and the more its shunning action on the input signal to the operational amplifier A2. Through the divider action of the interstage coupling network comprised of the resistor R35 and the transistor Q32, a considerable amount of signal attenuation is obtained to keep the level of the output signal from the operational amplifier A2 more constant, and thus providing an automatic gain control loop for the amplifier A2.

From the amplifier A2, the output signal is fed through the capacitor C52 to the control unit 12 and also through the resistor R53 to an auxilliary phone jack 20 where the signal can be monitored with an earphone for optical alignment during system installation or functional checkout, in the manner described more fully below.

Figure 4:
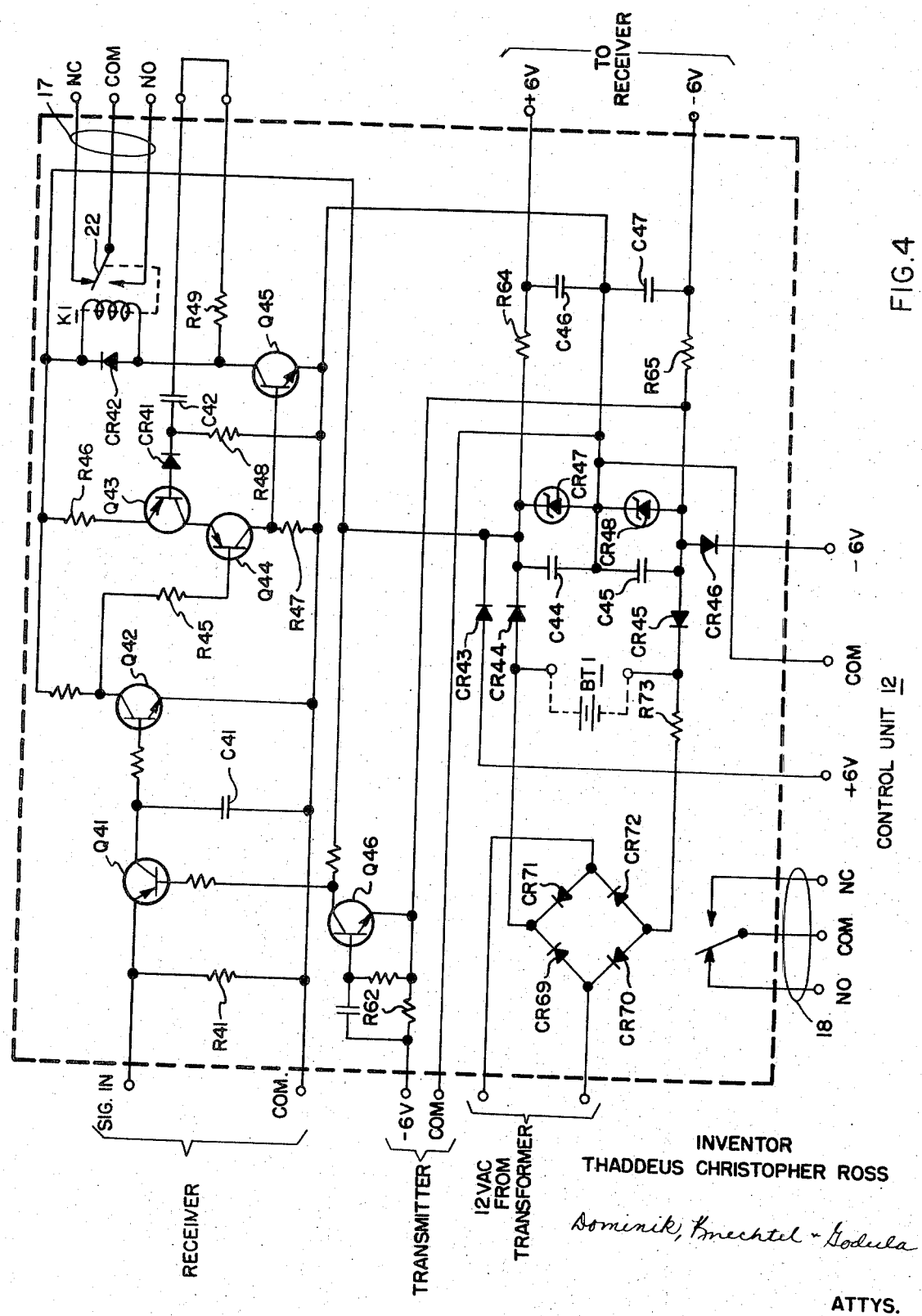
FIG. 4 is a schematic of the control unit of the intrusion sensing system.

Referring now to FIG. 4 which is a schematic of the control unit 12, it can be seen that the receiver's output signal, from the amplifier A2, is coupled to the control unit 12 across the input terminating resistor R41 and into a synchronized gate transistor Q41. Switching of this synchronized gate transistor Q41 is controlled by the action of a gate driver transistor Q46 which monitors the power drawn on the minus 6 volt line by the transmitter 10.

The voltage drop across the resistor R62 which occurs each time the transmitter 10 puts out an energy pulse is amplified by the gate driver transistor Q46 and is applied to operate the gate transistor Q41. This energy pulse is simultaneously detected by the receiver 11 and, as indicated above, is coupled to the control unit 12, as positive polarity output pulse. When this output pulse is coupled into the gated transistor Q41, a positive charge is transferred to an integrating capacitor C41. In the absence of an input signal, or when the input signal is out of phase or of the wrong polarity during the operation of the gate transistor Q41, there will be no transfer of positive charge to the capacitor C41. In the absence of signal, in fact, any charge previously built up on the capacitor C41 will be quickly drained off through the conducting transistor Q41 and the resistor R41 to ground.

A "safe" or "no alarm" system status is maintained only when the capacitor C41 has a continuous positive charge on it of sufficient amplitude to supply base current to the transistor Q42 to cause the latter to conduct. When the transistor Q42 is conducting, its collector voltage is held near ground and base current to drive the transistor Q44 thereby is provided through the resistor R45. The transistor Q44 when conducting, feeds collector current which splits between the base current for the transistor Q45 and current to ground through the resistor R47. The transistor Q45 is held in conduction by the base current so supplied, and draws current through the coil of the relay K1 holding its contact 22 normally closed. This energized stage of relay K1 signifies the "safe" or "no alarm" system condition.

An auxilliary timing circuit comprised of the network including the resistor R46, the transistor Q43, the diode CR41, the resistor R48, the capacitor C42 and the resistor R49 defines a reset delay for the relay K1 in the event the optical signal is momentarily interrupted and the system signals "alarm." The purpose of this auxilliary timing circuit is to prevent the relay K1 from returning to "safe" condition too quickly for the alarm condition to be noted. Such an event may occur when, for example, the alarm annunciator device connected to the system by the purchaser or user thereof is too slow in operating.

During normal operation, the transistor Q43 is held conductive through the action of the resistor R48 drawing base current to common in series with the diode CR41. The transistor Q43 supplies the emitter current to the transistor Q44 and acts, in general, as a short circuit between the resistor R46 and the transistor Q44. The resistor R46 limits the maximum base current which the arrangement can deliver to the transistor Q45.

When the optical beam is interrupted, the transistor Q42 cuts off, cutting off the transistor Q44 and, in turn, the transistor Q45. The collector voltage of the transistor Q45 rises rapidly to plus 6 volts, since the voltage drop in the coil of the relay K1 has disappeared. The voltage rise on the collector of the transistor Q45 is coupled through the resistor R49 and the capacitor C42 to the junction of the capacitor C42 with the resistor R48 raising the voltage drop across the resistor R48 by nearly six volts. Since the quiescent value of the voltage at that point was around plus 5 volts, it becomes approximately plus eleven volts and reverse biases the diode CR41 to cut off all of the base current to the transistor Q43. The RC time constant of the resistor R48 and the capacitor C42 defines the time for which the diode CR41, and therefore, the transistor Q43, remain cut off.

While the transistor Q43 is cut off, there is no emitter current available to the transistor Q44 and therefore no collector current to drive the base of the transistor Q45. The relay K1 therefore remains de-energized until the RC time constant of the resistor R48 and the capacitor C42 expires.

If the signal at the input of the control unit 12 has been restored in the meantime, termination of the delay time constant allows the transistor Q43 base current to flow through the resistor R48 once more, and conduction through the transistors Q43 and Q44 restores the base current of the transistor Q45 to turn the latter on. The drop in voltage on the collector of the transistor Q45 from plus 6 volts to nearly ground couples through the capacitor C42, this time to increase the base current of the transistor Q43. The resistor R49 is designed to limit this current to prevent excessive base current dragging the base of transistor Q43 to ground and drawing off the total available current through the resistor R46 from the transistor Q44. If the drive through the capacitor C42 were allowed to momentarily ground the base of the transistor Q43, the voltage on the emitter of the transistor Q44 would be insufficient to support emitter current of the transistor Q44 necessary to supply base drive to the transistor Q45. If this were to occur, the transistor Q45 would cut off, the relay K1 would relax, and the sequence could become self-propagating in an unstable oscillatory mode.

The diode CR42 is a damper across the inductance of the relay coil of the relay K1. When the coil current is interrupted by the transistor Q45 cutting off in response to signal interruption, the coil current falls at some rapid rate expressible as the differential $di/dt$. Depending on the rate of this current fall, the reactive voltage appearing across the coil equal to $e = Ldi/dt$, where $L$ is the coil inductance, may have sufficiently large magnitude to break down the collector junction of the transistor Q45. The diode CR42 shorts out this potentially damaging potential by clamping the collector of the transistor Q45 to plus 6 volts.

The control unit 12, as indicated above, also supplies power to all of the systems circuits. The primary source of power is low (12 volts) voltage AC from the external step-down transformer 15 (FIG. 1), which is fed to a rectifier bridge including the diodes CR69–72. The rectified but unfiltered DC is coupled through the resistor R73 to a standby storage battery BT1 which is optionally installed. Stabilization of the charging voltage for the battery BT1 is provided by the series dropping diodes CR44 and CR45 and the Zener diodes CR47 and CR48.

Operating voltages for all circuits also are stabilized by the diodes CR47 and CR48, with additional stages of filtering for the power supplied to the receiver 11 being provided by the resistor R64, the capacitor C46 and the resistor R65 and the capacitor C48. The capacitors C44 and C45 provide all of the energy storage and filtering in the event that no standby batteries are installed in the system. The diodes CR43 and CR46 are provided to permit connection with auxilliary standby dry cell batteries and to prevent damage from inadvertently reversed connections as well as to prevent the supply from feeding charging current to the cells.

Now that the construction and operation of the various units of the intrusion sensing system have been described, the method of installing the system and its overall operation can be more particularly described. The small size of the transmitter 10 and the receiver 11 permits them to be easily installed for both industrial, household and other various uses, such as for example, on marine vessels such as boats. The transmitter 10 and the receiver 11 can be mounted using swivel mounts, with each unit being mounted on the surface of or within parallel and opposing walls. Alternatively, the transmitter and receiver can be mounted in conjunction with or the aid of beam deflecting mirrors such that the optical signal developed by the transmitter 10 is incident on the receiving optics and detector of the receiver 11. The fact that the system is operable on storage batteries makes the system particularly applicable for this latter use, since in many instances a source of power is not available. In this respect, when standby storage batteries are provided in the system, the above-described charging circuit functions as a trickle-charger for the batteries so as to maintain them fully charged for positive operation in the event of power failure. Fresh to fairly fresh batteries should operate the system for a minimum period of approximately 72 hours.

The control unit 12 and the transformer 15 are mounted in a suitable location, with the transformer 15 being connected to a source of power and coupled to the control unit 12 via the low voltage wires 16. The control unit 12, in turn, then is coupled to the transmitter 10 by means of the low voltage wires 13 and to the receiver 11 by means of the low voltage wires 14. The control unit 12 also is coupled by means of the low voltage wires 17 to an annunciator or local alarm (not shown) for audibly indicating an alarm in the event an intruder activates the system. Alternatively, the control unit 12 can be used to silently send an alarm signal to a remote monitoring position. In the event the connections are tampered with, or the cover of the control unit 12 is removed, an alarm (not shown) coupled to the tamper interlock (not shown) thereof is activated, via the low voltage wires 18.

The system, of course, operates on the interrupted-beam principle, with the transmitter 10 producing an invisible infrared light at 9,000 angstroms. The transmitter 10 and the receiver 11 can be easily installed and aligned at the maximum working distance of the system which is approximately 300 feet, although the system has operated satisfactorily at distances of 300–600 feet, without the need of complicated optical alignment devices of meters. This is accomplished merely by activating the system, advantageously without the alarms connected during installation, and plugging a pair of head phones (not shown) into the telephone jack 20 of the receiver. Now, the transmitter 10, or the receiver 11, is aligned with the other so that the infrared light produced by the transmitter 10 is incident on and detected by the receiver 11. When the two are aligned, the receiver 11 puts out a signal, in the manner described above, to the control unit 12, which signal is audible on the head phones. Best alignment is achieved when the audible tone is the loudest.

With the system installed and in operation, the modulated infrared beam put out by the transmitter 10 is detected by the receiver 11, with the latter, in turn, coupling an output signal to the control unit 12. The power drawn by the transmitter 10 is monitored, and each time an output or energy pulse is produced, the synchronized gate transistor Q41 is gated to receive the output signal from the receiver 11. Receipt of the positive output signal from the receiver 11 maintains the positive charge on the capacitor C41, so that the relay K1 is held operated, in the manner described above, to thereby indicate a "safe" or "no alarm" system condition.

If no signal is received by the control unit 12, or the signal is out of phase or of the wrong polarity, there is no positive charge transferred to the capacitor C41. As a result, the relay K1 is allowed to drop out, thereby closing the contact to actuate the alarm indicating the detection of an intruder.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. An intrusion sensing system comprising, in combination: a control unit; a transmitter for transmitting pulses of optical energy; a receiver arranged along a line of sight such that said pulses of optical energy are incident thereon, said receiver simultaneously detecting and providing an output pulse to said control unit for each pulse of optical energy detected; said control unit including means for supplying power to said transmitter, and monitoring means for monitoring the operation of said transmitter in transmitting a pulse of optical energy; gating means operated by said monitoring means to receive said output pulse from said receiver, said transmitter in transmitting a pulse of optical energy creating a power line disturbance, said monitoring means detecting said power line disturbance and simultaneously in response to the same gating said gating means to receive said output pulse from said receiver, and means operated responsive to the receipt of said output pulse from said receiver to cause said control unit to indicate a safe condition, said last-mentioned means being responsive in the absence of said output pulse or the receipt of an output pulse which is out of phase or of the wrong polarity to cause said control unit to indicate an alarm condition.

2. The intrusion sensing system of claim 1, wherein said transmitter transmits and said receiver detects pulses of infrared energy.

3. The intrusion sensing system of claim 1, wherein said receiver is arranged directly along a line of sight with said transmitter.

4. The intrusion sensing system of claim 1, wherein said receiver is arranged along a line of sight with said transmitter with the aid of beam deflecting means.

5. The intrusion sensing system of claim 1, wherein said control unit further includes reset delay means for causing said control unit to indicate an alarm condition for a pre-established time period, in the event the optical signal incident on said receiver means is momentarily interrupted.

6. The intrusion sensing system of claim 1, wherein said control unit further comprises indicator means for indicating the condition of said system, and control means for operating said indicator means, said monitoring means detecting the power line distrubance created when said transmitter transmits a pulse of optical energy and simultaneously keying said gating means to gate the output pulse from said receiver to said control means, said control means upon receipt of said output pulse operating said indicator means to indicate a safe condition of said system.

7. The intrusion sensing system of claim 1, wherein said control unit comprises a relay coupled to an alarm, control means including capacitor means for operating said relay, said output signal from said receiver being coupled to said capacitor means and maintaining an established charge thereon whereby said control means is operative to energize said relay to thereby cause said system to indicate a safe condition.

* * * * *